United States Patent
Hsiao et al.

(10) Patent No.: US 8,031,432 B2
(45) Date of Patent: Oct. 4, 2011

(54) MAGNETIC WRITE HEAD HAVING HELICAL COIL WITH A FIN STRUCTURE FOR REDUCED HEAT INDUCED PROTRUSION

(75) Inventors: Wen-Chien David Hsiao, San Jose, CA (US); Edward Hin Pong Lee, San Jose, CA (US); Jennifer Ai-Ming Leung, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 964 days.

(21) Appl. No.: 11/955,277

(22) Filed: Dec. 12, 2007

(65) Prior Publication Data
US 2009/0154011 A1    Jun. 18, 2009

(51) Int. Cl.
*G11B 5/17*    (2006.01)
*G11B 5/40*    (2006.01)

(52) U.S. Cl. .......... 360/123.05; 360/123.06; 360/125.32
(58) Field of Classification Search ............. 360/125.32, 360/123.05, 123.06
See application file for complete search history.

(56) References Cited

U.S. PATENT DOCUMENTS

| | | | |
|---|---|---|---|
| 2,347,063 A | 4/1944 | Pollard et al. | 171/252 |
| 2,378,884 A | 6/1945 | Seifert | 175/356 |
| 3,142,809 A | 7/1964 | Remenyik | 336/61 |
| 3,150,339 A | 9/1964 | Wilska | 336/61 |
| 3,466,743 A | 9/1969 | De Puy | 29/602 |
| 3,684,992 A | 8/1972 | Huguet et al. | 336/58 |
| 3,731,243 A | 5/1973 | Davis | 336/61 |
| 3,965,378 A | 6/1976 | Liebe et al. | 310/65 |
| 4,902,998 A | 2/1990 | Pollard | 336/60 |
| 5,247,410 A | 9/1993 | Ebihara et al. | 360/106 |
| 5,929,733 A | 7/1999 | Anzawa et al. | 336/61 |
| 6,278,354 B1 | 8/2001 | Booth | 336/200 |
| 6,654,202 B2 | 11/2003 | Rea et al. | 360/123 |
| 6,914,750 B2 | 7/2005 | Garfunkel et al. | 360/234.3 |
| 7,193,817 B2 * | 3/2007 | Lille | 360/128 |
| 7,667,927 B2 * | 2/2010 | Kobayashi et al. | 360/123.06 |
| 2003/0021065 A1 * | 1/2003 | Yamada et al. | 360/126 |
| 2007/0165329 A1 * | 7/2007 | Aoki et al. | 360/123 |

FOREIGN PATENT DOCUMENTS

JP    62128011 A  *   6/1987

* cited by examiner

*Primary Examiner* — Julie Anne Watko
(74) *Attorney, Agent, or Firm* — Zilka-Kotab, PC

(57) ABSTRACT

A magnetic write head having a write coil configured to dissipate heat away from the write head to minimize thermal protrusion. The write coil is formed as a helical coil having upper and lower leads that are connected by electrically conductive studs formed therebetween. The first and leads extend beyond the studs to form heat conducting fins that conduct heat away from the write head where it can be dissipated into surrounding structure.

14 Claims, 4 Drawing Sheets

MAGNETIC WRITE HEAD HAVING HELICAL COIL WITH A FIN STRUCTURE FOR REDUCED HEAT INDUCED PROTRUSION

FIELD OF THE INVENTION

The present invention relates to perpendicular magnetic recording and more particularly to a write pole having a helical coil with a heat sinking fin structure for reduced write induced thermal protrusion in the write head region.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a magnetic write head having a write coil configured to dissipate heat away from the write head to minimize thermal protrusion. The write coil is formed as a helical coil having upper and lower leads that are connected by electrically conductive studs formed therebetween. The first and leads extend beyond the studs to form heat conducting fins that conduct heat away from the write head, where the heat can be dissipated into surrounding structure.

The write coil can be configured with just the top or just the bottom leads extending beyond the studs to form heat conducting fins, but is preferably formed with both the upper and lower leads extending beyond the studs to form heat conducting fins.

The heat dissipating coil structure provides a significant reduction in thermal protrusion, and has been found to provide a 20% reduction in write pole protrusion.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
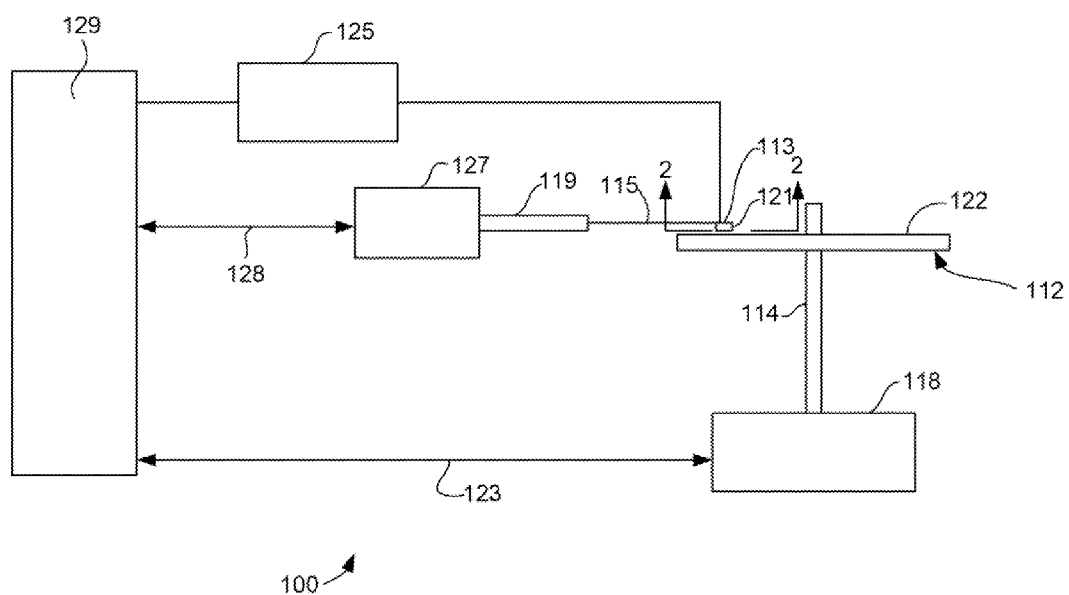
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
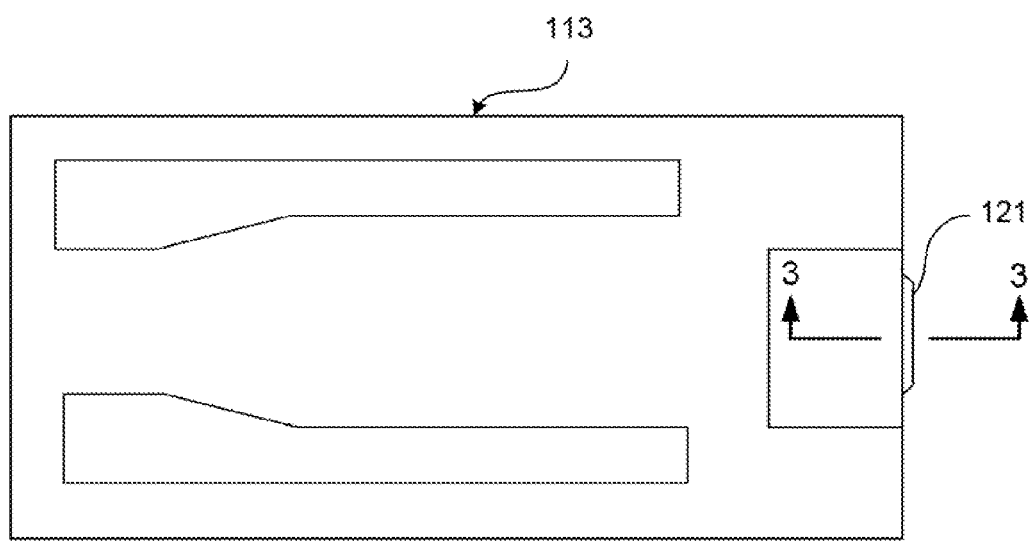
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
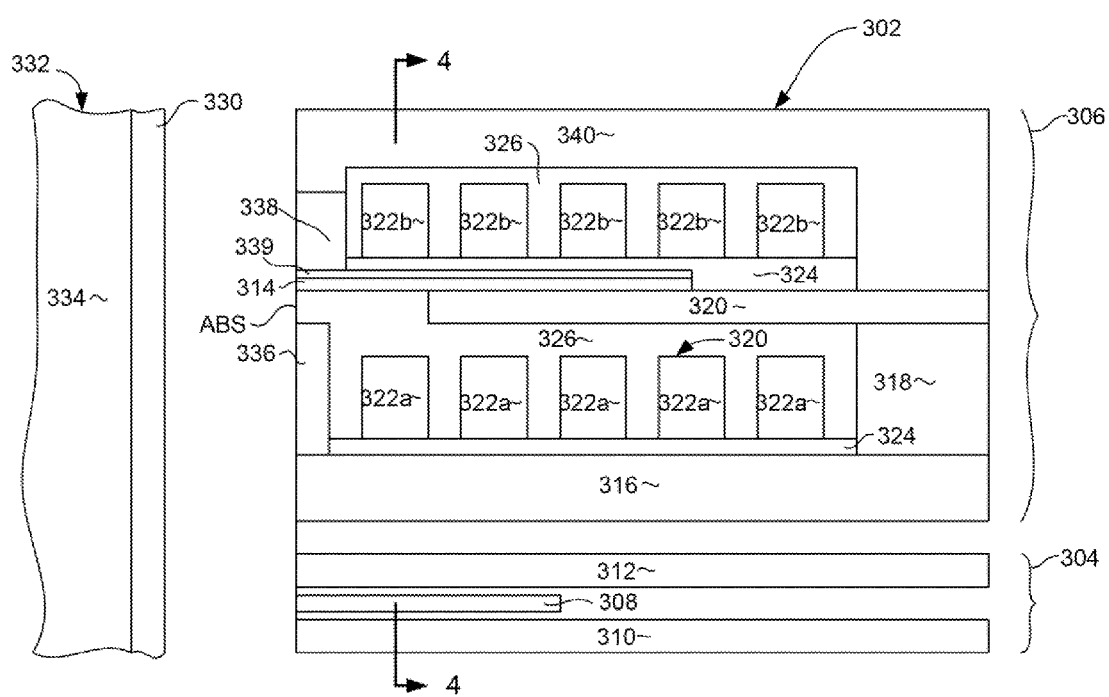
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and also passes above the write pole 314 and shaping layer 320. The write coil 322 is a helical coil having a structure that will be described in greater detail below, and includes a plurality of lower leads 322a and upper leads 322b. The write coil 322 can be formed upon an insulation layer 324 and can be embedded in a coil insulation layer 326 such as alumina and or hard baked photoresist.

In operation, when an electrical current flows through the write coil 322. A resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and week that it does not erase the data bit recorded by the write head 314.

In order to increase write field gradient, and therefore, increase the speed with which the write head 306 can write data, a trailing magnetic shield 338 can be provided. The trailing magnetic shield 338 is separated from the write pole by a non-magnetic write gap 339, and may be connected with the shaping layer 320 and/or back gap 318 by a trailing return pole 340. The trailing shield 338 attracts the magnetic field from the write pole 314, which slightly cants the angle of the magnetic field emitting from the write pole 314. This canting of the write field increases the speed with which write field polarity can be switched by increasing the field gradient.

One problem experienced by former write heads is that of thermal protrusion. In order to generate a strong write field, a high current must flow through the coil 322. This current generates Joule effect heating, and this heat from the coil, having no where to go, dissipates to the surrounding structures of the write head such as the write pole 314. As a result, structures such as the write pole 314 and the surrounding area experience thermal expansion, and protrude from the air bearing surface ABS. The amount of protrusion of the structure (e.g. write pole 314 and the surrounding area) is a product of its temperature increase and the thermal expansion coefficient of the material of the structure.

Fly heights of heads are becoming extremely small. Therefore, any thermal expansion of a structure such as a write pole 314 causes large relative variation of the fly height and in many cases can cause the structure to actually contact the magnetic medium 332, an event known as a "crash". Since the thermal expansion coefficient of the structures making up the write head 302 can not be significantly altered, the only way to reduce the thermally induced protrusion of structures of the write head is to reduce the temperature increase of these structures. The present invention provides a write coil design that dissipates heat from the write coil away from the other structures of the write head 302, thereby significantly reducing the temperature increase of these structures.

Figure 4:
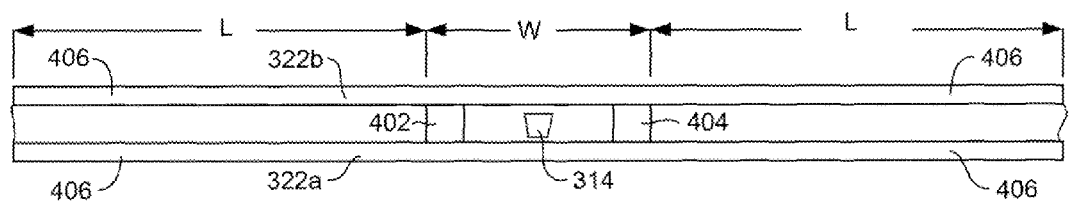
FIG. 4 is view taken from line 4-4 of FIG. 3 showing a cross sectional view of a write coil according to an embodiment of the invention.

FIG. 4 shows a cross section of the coil as taken from line 4-4 of FIG. 3. Although the write pole 314 is shown in FIG. 4, various other structures of the write head 302 have not been shown so that the write coil 322 can be seen more clearly. FIG. 4 shows one of the lower leads 322a and one of the upper leads 322b. The lower lead 322a is connected with the upper lead 322b by an electrically conductive connection stud 402. Another stud 404 connects one of the leads (for example the upper lead 322b) with another, adjacent one of the lower leads 322a which is not shown in FIG. 4, but which would be located either into or out of the plane of the page in FIG. 4. In this manner of connecting upper and lower leads 322b, 322a is continued with successive leads to form a helical coil structure. Therefore, this forms a helical write coil having a coil width W through which electrical current can flow during operation of the write head 302.

As can be seen, the upper and lower leads 322a, 322b extend significantly beyond the studs 402, and therefore extend beyond the actual helical coil portion that is bounded by the width W. These outward extending portions 406 provide heat dissipating fins that conduct heat generated in the coil portion away from the rest of the write head structures. For example, these fins 406 conduct heat away from the write pole 314, thereby preventing thermal protrusion of the write pole 314 and the surrounding area. Heat conducted through the fins 406 can then be dissipated into an outer portion of the slider (not shown), that acts as a heat sink to absorb this heat.

Although only one of the upper coils and one of the lower coils is shown in FIG. 4 has having a heat sinking fin, it should be pointed out that many or all of the upper and lower leads can be constructed with such heat sinking fins. Also, the write head can be constructed such that only the lower leads 322a have heat sinking fins 406 or such that only the upper leads 322b have heat sinking fins. Preferably, however, in order to maximize heat dissipation, both the lower leads 322a and lower leads 322b are formed with heat sinking fins. The heat sinking fins preferably have a length L that is at least as long as the width W of the coil portion (i.e. at least as long as the distance between the studs 402, 404. The fins 406 can have a length L that is 10 um or greater or 10-20 um.

The above described coil configuration with heat sinking fin has resulted in a significant reduction in heat related protrusion. For example, such a structure has provided a 0.2 um reduction in write pole protrusion as compared with structures formed without such heat sinking fins. This corresponds to a 20% reduction in write pole protrusion.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head, comprising:
    a magnetic write pole extending to an air bearing surface;
    a magnetic return pole, magnetically connected with the write pole in a region removed from the air bearing surface;
    a helical coil arranged around the write pole so as to induce a magnetic flux in the write pole when electrical current flows through the write coil, the write coil further, comprising:
    a plurality of lower, substantially planar leads disposed in a leading direction relative to the write pole;
    a plurality of upper, substantially planar leads disposed in a leading direction relative to the write pole; and
    a plurality of electrically conductive studs, each electrically conducting stud connecting one of the lower leads with an upper lead, and wherein each of upper and lower leads extends beyond the electrically conductive stud to which it is connected to form a heat conducting fin extending laterally outward for dissipating heat from the write head.

2. A magnetic write head as in claim 1 wherein the heat conducting fin conducts heat away from the write pole to prevent thermally induced protrusion of the write pole during operation.

3. A write head as in claim 1 wherein the at least one heat conducting fin has a length of 10-20 um.

4. A write head for perpendicular magnetic data recording, comprising:
    a magnetic write pole having a pole tip extending to an air bearing surface;
    a magnetic return pole that is magnetically connected with the write pole in a region removed from the air bearing surface;
    a plurality of electrically conductive, substantially planar lower coil leads formed beneath the write pole;
    a plurality of electrically conductive, substantially planar upper coil leads formed above the write pole;
    a first set of electrically conductive studs, formed on a first side of the write pole each of the first set of electrically conductive studs connecting one of the electrically conductive upper leads with a one of the electrically conductive lower leads; and
    a second set of electrically conductive studs, formed on a second side of the write pole each of the second set of electrically conductive studs connecting one of the electrically conductive upper leads with a one of the electrically conductive lower leads; wherein
    at least one of the upper and at least one of the lower electrically conductive leads extends beyond an electrically conductive stud connected therewith to form a heat conducting fin laterally outward.

5. A magnetic write head as in claim 4 wherein the fin conducts heat away from the write pole during operation of the write head.

6. A magnetic write head as in claim 4 wherein electrically conductive upper coil leads, electrically conductive lower coil leads and electrically conductive studs together form an electrically conductive, helical write coil through which an electrical current can flow.

7. A magnetic write head as in claim 4 wherein electrically conductive upper coil leads, electrically conductive lower coil leads and electrically conductive studs together form an electrically conductive, helical write coil through which an electrical current can flow, the coil having a width defined by the distance between the first set of studs and the second set of studs.

8. A magnetic write head as in claim 4 wherein the electrically conductive upper coil leads, the electrically conductive lower coil leads and the electrically conductive studs together form an electrically conductive, helical write coil through which an electrical current can flow, the coil having a width W defined by the distance between the first set of studs and the second set of studs, and wherein the heat conducting fin extends from the coil by a distance that is at least as great as the width W.

9. A magnetic write head as in claim 4 wherein the electrically conductive upper coil leads, the electrically conductive lower coil leads and the electrically conductive studs together form an electrically conductive, helical write coil through which an electrical current can flow, the coil having a width W defined by the distance between the first set of studs and the second set of studs, and wherein the heat conducting fin extends from the coil by a distance of 10-20 um.

10. A magnetic write head as in claim 4 wherein each of the electrically conductive upper coil leads extends laterally outward beyond an electrically conductive stud connected therewith to form a heat conducting fin.

11. A magnetic write head as in claim 4 wherein each of the electrically conductive lower coil leads extends laterally outward beyond an electrically conductive stud connected therewith to form a heat conducting fin.

12. A magnetic write head as in claim 4 wherein each of the electrically conductive lower coil leads and each of the electrically conductive upper coil leads extends laterally outward beyond an electrically conductive stud connected therewith to form a heat conducting fin.

13. A magnetic write head as in claim 4 further comprising a plurality of heat conducting fins formed at a first side of the write pole and a plurality of heat conducting fins formed at a second side of the write pole.

14. A magnetic write head as in claim 4 further comprising a plurality of heat conducting fins extending from the upper electrically conductive coil leads at both first and second sides of the write pole and a plurality of heat conducting fins extending from the lower leads at both the first and second sides of the write pole.

\* \* \* \* \*